(12) United States Patent
Cheong et al.

(10) Patent No.: US 8,855,432 B2
(45) Date of Patent: Oct. 7, 2014

(54) COLOR COMPONENT PREDICTIVE METHOD FOR IMAGE CODING

(71) Applicant: Sony Corporation, Tokyo (JP)

(72) Inventors: Hye-Yeon Cheong, Milpitas, CA (US); Mohammad Gharavi-Alkhansari, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 13/705,092

(22) Filed: Dec. 4, 2012

(65) Prior Publication Data
US 2014/0153822 A1  Jun. 5, 2014

(51) Int. Cl.
  *G06K 9/36* (2006.01)
  *G06K 9/46* (2006.01)
  *G06K 9/00* (2006.01)
  *G06T 9/00* (2006.01)
(52) U.S. Cl.
  CPC ....................................... *G06T 9/004* (2013.01)
  USPC ............................ 382/232; 382/166; 382/238
(58) Field of Classification Search
  None
  See application file for complete search history.

(56) References Cited

U.S. PATENT DOCUMENTS

| 6,785,425 | B1 | 8/2004 | Feder et al. |
| 7,342,607 | B2 | 3/2008 | Liu |
| 7,697,783 | B2 * | 4/2010 | Lee et al. ....................... 382/275 |
| 7,792,370 | B2 * | 9/2010 | Sun ............................... 382/232 |
| 8,170,355 | B2 * | 5/2012 | Song .............................. 382/233 |
| 2005/0111741 | A1 * | 5/2005 | Kim et al. ...................... 382/232 |
| 2006/0210156 | A1 * | 9/2006 | Lei et al. ....................... 382/166 |
| 2007/0121728 | A1 * | 5/2007 | Wang et al. .............. 375/240.18 |

FOREIGN PATENT DOCUMENTS

WO    2011088594 A1    7/2011

OTHER PUBLICATIONS kIM et al, RGB Video Coding Using Residual Color Transform, SAMSUNG Journal of Innovative Technology, Aug. 2005, vol. 1, No. 1.*
Goffman et al, Color Image Compression using Inter-color Correlation, IEEE ICIP 2002.*

* cited by examiner

*Primary Examiner* — Andrae S Allison
(74) *Attorney, Agent, or Firm* — Haverstock & Owens LLP

(57) ABSTRACT

A color component predictive method determines a base color component and uses the base color component to compute offsets for other color components. The block is then able to be coded using the base color component and the offsets of the other color components. For decoding, the base color component is used with the offsets to regenerate the other color components.

19 Claims, 3 Drawing Sheets

100 →

| | Pel 1 | Pel 2 | Pel 3 | Pel 4 | .... | Pel 15 | Pel 16 |
|---|---|---|---|---|---|---|---|
| R | r1 | r2 | r3 | r4 | .... | r15 | r16 |
| G | g1 | g2 | g3 | g4 | .... | g15 | g16 |
| B | b1 | b2 | b3 | b4 | .... | b15 | b16 |

Original block of 16 pixels

102 →

| | Pel 1 | Pel 2 | Pel 3 | Pel 4 | .... | Pel 15 | Pel 16 |
|---|---|---|---|---|---|---|---|
| R | g1+R | g2+R | g3+R | g4+R | .... | g15+R | g16+R |
| G | g1 | g2 | g3 | g4 | .... | g15 | g16 |
| B | g1+B | g2+B | g3+B | g4+B | .... | g15+B | g16+B |

Decoded block using Nature Gray Mode where, $B = \text{mean}(b_n) - \text{mean}(g_n)$
$R = \text{mean}(r_n) - \text{mean}(g_n)$

104 →

| header | g1 | g2 | g3 | .... | g15 | g16 | R | B |
|---|---|---|---|---|---|---|---|---|

Corresponding bitstream

Fig. 1

COLOR COMPONENT PREDICTIVE METHOD FOR IMAGE CODING

FIELD OF THE INVENTION

The present invention relates to the field of image processing. More specifically, the present invention relates to image coding.

BACKGROUND OF THE INVENTION

Conventional image compression systems suffer from a number of problems. They are unable to exploit visual masking and other properties of the Human Visual System (HVS) which vary spatially with image content. This is because the quantization parameters used by these algorithms are typically constant over the extent of the image. As a result, images are unable to be compressed efficiently. Also, to achieve a target bit-rate or visual quality using these systems, the image must be compressed multiple times. Additionally, image compression becomes less efficient for a textured image due to its low spatial correlation.

SUMMARY OF THE INVENTION

A color component predictive method determines a base color component and uses the base color component to compute offsets for other color components. The block is then able to be coded using the base color component and the offsets of the other color components. For decoding, the base color component is used with the offsets to regenerate the other color components.

In one aspect, a method of image coding programmed in a memory of a device comprises determining a color component as a base color component, calculating one or more offsets using the base color component, coding the base color component independently and coding the one or more offsets. Calculating the one or more offsets includes determining an additional mean of each of one or more additional color components, determining a base mean of the base color component and subtracting the additional mean from the base mean. The method further comprises capturing an image. The method further comprises using spatial correlation to compress the base color component. The method further comprises using temporal correlation to compress the base color component. The base color component is green and the one or more additional color components include red and blue. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.

In another aspect, a method of image decoding programmed in a memory of a device comprises receiving a base color component and offsets and reconstructing one or more color components using the base color component and the offsets. One or more additional color components are reconstructed by adding the base color component and the offset for each additional color component. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.

In another aspect, a system programmed in a controller of a device comprises a base module for determining a color component as a base color component, a calculation module for calculating one or more offsets using the base color component and a coding module for coding the base color component independently and coding the one or more offsets. Calculating the one or more offsets includes determining an additional mean of each of one or more additional color components, determining a base mean of the base color component and subtracting the additional mean from the base mean. The system further comprises an acquisition module for capturing an image. The system further comprises a spatial correlation module for using spatial correlation to compress the base color component. The system further comprises a temporal correlation module for using temporal correlation to compress the base color component. The base color component is green and the one or more additional color components include red and blue. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.

In another aspect, an apparatus comprises an image acquisition component for acquiring an image, a memory for storing an application, the application for: determining a color component as a base color component of the image, calculating one or more offsets using the base color component, coding the base color component independently and coding the one or more offsets and a processing component coupled to the memory, the processing component configured for processing the application. Calculating the one or more offsets includes determining an additional mean of each of one or more additional color components, determining a base mean of the base color component and subtracting the additional mean from the base mean. The application includes using spatial correlation to compress the base color component. The application includes using temporal correlation to compress the base color component. The base color component is green and the one or more additional color components include red and blue.

BRIEF DESCRIPTION OF THE DRAWINGS

FIG. 1 illustrates an example of implementing the color component predictive method according to some embodiments.

DETAILED DESCRIPTION OF THE PREFERRED EMBODIMENT

The color component predictive method achieves low-complexity image coding by exploiting correlation between color components. One color component is chosen as the base and coded independently from the other color components. The other color components are then estimated by the base color component plus an offset value. The offset value is computed as: mean (other color)−mean (base color). For example, for the low complexity image coding application with RGB input image, given a block of pixels, green is able to be chosen as the base color and coded as is. Then, two offset values are coded for red and blue each. At the decoder, red and/or blue color components of a given block are reconstructed by the green value (base color) plus the offset.

FIG. 1 illustrates an example of implementing the color component predictive method according to some embodiments. An original block 100 of the image is shown. The block includes 16 pixels, and each color component for each pixel is shown: r1, r2, ..., r16; g1, g2, ..., g16 and b1, b2, ..., b16. A decoded block 102 is also shown. In the example, red and blue components are estimated from green with an average offset constant. The offset for blue (B) is calculated using the equation B=mean ($b_n$)−mean ($g_n$). The offset for red (R) is calculated using the equation R=mean ($r_n$)−mean ($g_n$). Each color component for each pixel is shown using the base green plus the offset, for example, g1+R, g2+R, ..., g16+R and g1+B, g2+B, ..., g16+B. Since green is the base color used in this example, green is still g1, g2, ..., g16. A corresponding bitstream 104 is shown which includes a header, the components for each of the 16 pixels, R and B. In some embodiments, the green components for each of the pixels is coded as is, and in some embodiments, the green components are compressed further using spatial and/or temporal correlation.

Figure 2:
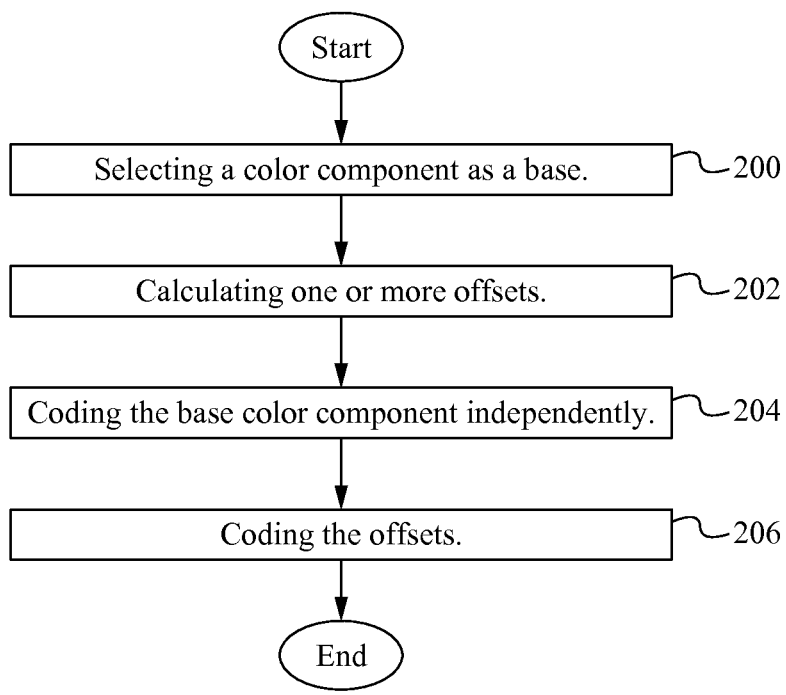
FIG. 2 illustrates a flow chart of implementing the color component predictive method according to some embodiments.

FIG. 2 illustrates a flow chart of implementing the color component predictive method according to some embodiments. In the step 200, a color component is selected as a base. In the step 202, one or more offsets are calculated. The offsets are calculated by subtracting the mean of the base color from the mean of the color component. In the step 204, the base color component is coded independently. In the step 206, the offsets for the other colors are coded. In some embodiments, the order of the steps is modified. In some embodiments, more or fewer steps are implemented. For example, the step of acquiring an image or a video is included. In another example, the base is compressed further using spatial and/or temporal correlation.

Figure 3:
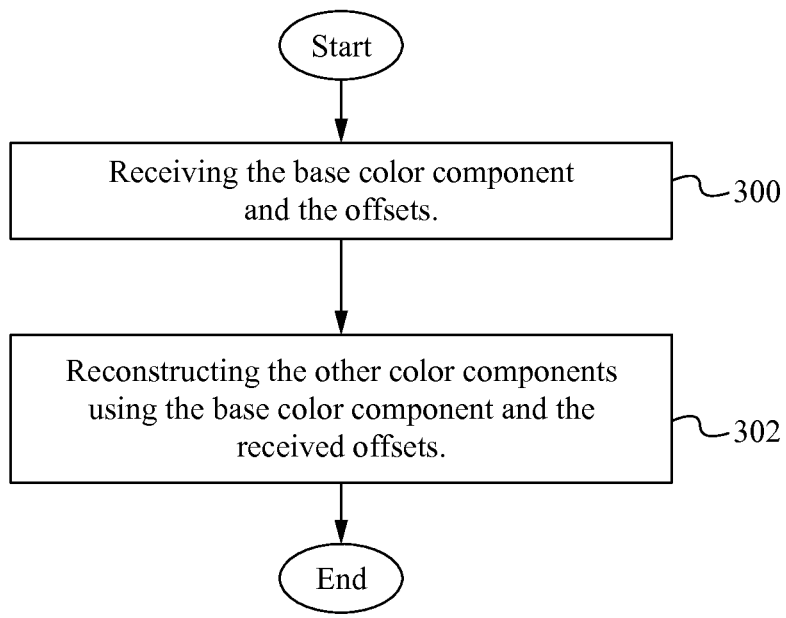
FIG. 3 illustrates a flowchart of implementing decoding of the color component predictive method according to some embodiments.

FIG. 3 illustrates a flowchart of implementing decoding of the color component predictive method according to some embodiments. In the step 300, the base color component and offsets are received. In the step 302, the other color components (e.g., red and blue) are reconstructed using the base color component and the received offsets. In some embodiments, more or fewer steps are implemented.

Figure 4:
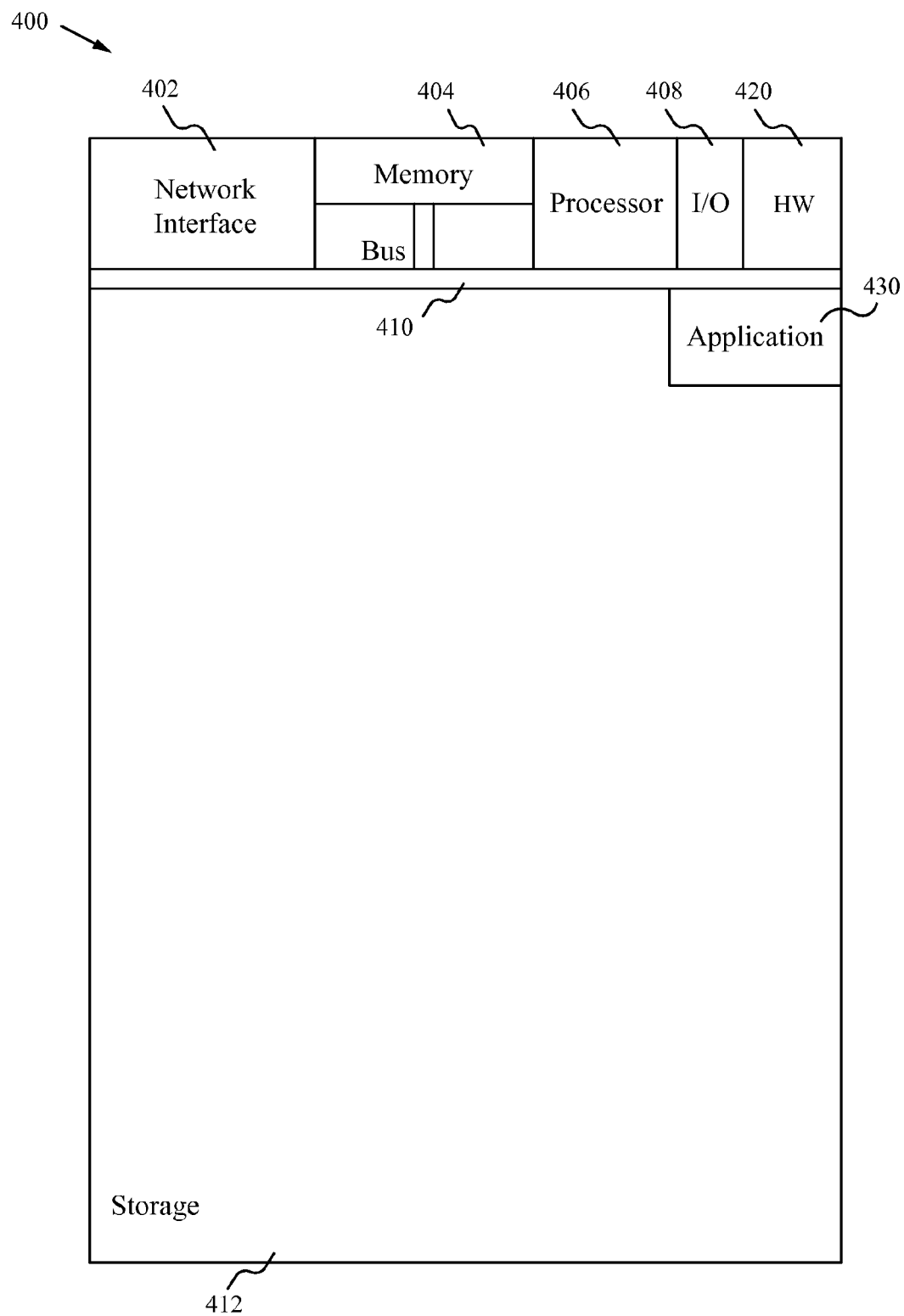
FIG. 4 illustrates a block diagram of an exemplary computing device configured to implement the color component predictive method according to some embodiments.

FIG. 4 illustrates a block diagram of an exemplary computing device configured to implement the color component predictive method according to some embodiments. The computing device 400 is able to be used to acquire, store, compute, process, communicate and/or display information such as images and videos. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. Color component predictive application(s) 430 used to perform the color component predictive method are likely to be stored in the storage device 412 and memory 404 and processed as applications are typically processed. More or less components shown in FIG. 4 are able to be included in the computing device 400. In some embodiments, color component predictive hardware 420 is included. Although the computing device 400 in FIG. 4 includes applications 430 and hardware 420 for the color component predictive method, the color component predictive method is able to be implemented on a computing device in hardware, firmware, software or any combination thereof. For example, in some embodiments, the color component predictive applications 430 are programmed in a memory and executed using a processor. In another example, in some embodiments, the color component predictive hardware 420 is programmed hardware logic including gates specifically designed to implement the color component predictive method.

In some embodiments, the color component predictive application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, Blu-ray® writer/player), a television, a home entertainment system or any other suitable computing device.

Although the color component predictive method has been described using the RGB color scheme, the method is able to apply to any color scheme.

The U.S. patent application Ser. No. 12/789,010, filed May 27, 2010, titled, "AN IMAGE COMPRESSION METHOD WITH RANDOM ACCESS CAPABILITY" is incorporated by reference herein in its entirety for all purposes.

To utilize the color component predictive method, a user acquires a video/image such as on a digital camcorder, and while or after the content is acquired, the color component predictive method automatically encodes/decodes the data. The color component predictive method occurs automatically without user involvement.

In operation, the color component predictive method exploits high correlation existing between color components for camera-captured images, leads to extremely low complexity at both the encoder and decoder, works well for camera-captured images as compared to synthetic images and works the best if it is combined with a method that exploits spatial/temporal correlations well.

Some Embodiments of Color Component Predictive Method for Image Coding

1. A method of image coding programmed in a memory of a device comprising:
   a. determining a color component as a base color component;
   b. calculating one or more offsets using the base color component;
   c. coding the base color component independently; and
   d. coding the one or more offsets.

2. The method of clause 1 wherein calculating the one or more offsets includes determining an additional mean of each of one or more additional color components, determining a base mean of the base color component and subtracting the additional mean from the base mean.
3. The method of clause 1 further comprising capturing an image.
4. The method of clause 1 further comprising using spatial correlation to compress the base color component.
5. The method of clause 1 further comprising using temporal correlation to compress the base color component.
6. The method of clause 2 wherein the base color component is green and the one or more additional color components include red and blue.
7. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.
8. A method of image decoding programmed in a memory of a device comprising:
   a. receiving a base color component and offsets; and
   b. reconstructing one or more color components using the base color component and the offsets.
9. The method of clause 8 wherein one or more additional color components are reconstructed by adding the base color component and the offset for each additional color component.
10. The method of clause 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.
11. A system programmed in a controller of a device comprising:
   a. a base module for determining a color component as a base color component;
   b. a calculation module for calculating one or more offsets using the base color component; and
   c. a coding module for coding the base color component independently and coding the one or more offsets.
12. The system of clause 11 wherein calculating the one or more offsets includes determining an additional mean of each of one or more additional color components, determining a base mean of the base color component and subtracting the additional mean from the base mean.
13. The system of clause 11 further comprising an acquisition module for capturing an image.
14. The system of clause 11 further comprising a spatial correlation module for using spatial correlation to compress the base color component.
15. The system of clause 11 further comprising a temporal correlation module for using temporal correlation to compress the base color component.
16. The system of clause 12 wherein the base color component is green and the one or more additional color components include red and blue.
17. The system of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.
18. An apparatus comprising:
   a. an image acquisition component for acquiring an image;
   b. a memory for storing an application, the application for:
      i. determining a color component as a base color component of the image;
      ii. calculating one or more offsets using the base color component;
      iii. coding the base color component independently; and
      iv. coding the one or more offsets; and
   c. a processing component coupled to the memory, the processing component configured for processing the application.
19. The apparatus of clause 18 wherein calculating the one or more offsets includes determining an additional mean of each of one or more additional color components, determining a base mean of the base color component and subtracting the additional mean from the base mean.
20. The apparatus of clause 18 wherein the application includes using spatial correlation to compress the base color component.
21. The apparatus of clause 18 wherein the application includes using temporal correlation to compress the base color component.
22. The apparatus of clause 19 wherein the base color component is green and the one or more additional color components include red and blue.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of image coding programmed in a memory of a device comprising:
   a. determining a color component as a base color component;
   b. calculating one or more offsets using the base color component, wherein calculating the one or more offsets includes determining an additional mean of each of one or more additional color components, determining a base mean of the base color component and subtracting the additional mean from the base mean;
   c. coding the base color component independently; and
   d. coding the one or more offsets.
2. The method of claim 1 further comprising capturing an image.
3. The method of claim 1 further comprising using spatial correlation to compress the base color component.
4. The method of claim 1 further comprising using temporal correlation to compress the base color component.

5. The method of claim 1 wherein the base color component is green and the one or more additional color components include red and blue.

6. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.

7. A method of image decoding programmed in a memory of a device comprising:
 a. receiving a base color component and offsets, wherein the one or more offsets are calculated by determining an additional mean of each of one or more additional color components, determining a base mean of the base color component and subtracting the additional mean from the base mean; and
 b. reconstructing one or more color components using the base color component and the offsets.

8. The method of claim 7 wherein one or more additional color components are reconstructed by adding the base color component and the offset for each additional color component.

9. The method of claim 7 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.

10. A system programmed in a controller of a device comprising:
 a. a base module for determining a color component as a base color component;
 b. a calculation module for calculating one or more offsets using the base color component, wherein calculating the one or more offsets includes determining an additional mean of each of one or more additional color components, determining a base mean of the base color component and subtracting the additional mean from the base mean; and
 c. a coding module for coding the base color component independently and coding the one or more offsets.

11. The system of claim 10 further comprising an acquisition module for capturing an image.

12. The system of claim 10 further comprising a spatial correlation module for using spatial correlation to compress the base color component.

13. The system of claim 10 further comprising a temporal correlation module for using temporal correlation to compress the base color component.

14. The system of claim 10 wherein the base color component is green and the one or more additional color components include red and blue.

15. The system of claim 10 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, and a home entertainment system.

16. An apparatus comprising:
 a. an image acquisition component for acquiring an image;
 b. a memory for storing an application, the application for:
  i. determining a color component as a base color component of the image;
  ii. calculating one or more offsets using the base color component, wherein calculating the one or more offsets includes determining an additional mean of each of one or more additional color components, determining a base mean of the base color component and subtracting the additional mean from the base mean;
  iii. coding the base color component independently; and
  iv. coding the one or more offsets; and
 c. a processing component coupled to the memory, the processing component configured for processing the application.

17. The apparatus of claim 16 wherein the application includes using spatial correlation to compress the base color component.

18. The apparatus of claim 16 wherein the application includes using temporal correlation to compress the base color component.

19. The apparatus of claim 16 wherein the base color component is green and the one or more additional color components include red and blue.

* * * * *